United States Patent [19]
McAtamney

[11] Patent Number: 5,343,191
[45] Date of Patent: Aug. 30, 1994

[54] PIPELINE LEAK DETECTION SYSTEM

[75] Inventor: Dennis E. McAtamney, Roseville, Mich.

[73] Assignee: Nibco, Inc., Elkhart, Ind.

[21] Appl. No.: 1,810

[22] Filed: Jan. 8, 1993

[51] Int. Cl.⁵ .............................................. G01M 3/18
[52] U.S. Cl. ...................... 340/605; 73/40.5 R
[58] Field of Search ...................... 340/605; 73/40.5 R

[56] References Cited

U.S. PATENT DOCUMENTS

| | | | |
|---|---|---|---|
| 3,184,966 | 5/1965 | Thornton et al. | 73/861.17 |
| 3,276,247 | 10/1966 | Bunn | 73/40.5 R |
| 3,280,620 | 10/1966 | Anderson | 73/40.5 R |
| 3,339,415 | 9/1967 | Wild | 73/40.5 R |
| 4,095,174 | 6/1978 | Ishido | 340/605 |
| 4,121,454 | 10/1978 | Cushing | 73/861.12 |
| 4,206,402 | 6/1980 | Ishido | 73/40.5 R X |
| 4,380,168 | 4/1983 | Ibe | 73/40.5 R |
| 4,441,073 | 4/1984 | Davis | |
| 4,590,431 | 5/1986 | Anderson et al. | 324/443 |
| 5,186,357 | 2/1993 | Foster | |

FOREIGN PATENT DOCUMENTS

| | | | |
|---|---|---|---|
| 1200874 | 2/1986 | Canada | 73/40.5 R |
| 0230404 | 7/1987 | European Pat. Off. | |
| 1475842 | 3/1969 | Fed. Rep. of Germany | |
| 2202826 | 8/1972 | Fed. Rep. of Germany | |
| 1294037 | 4/1962 | France | |
| 95242 | 6/1983 | Japan | 73/40.5 R |
| 102127 | 6/1983 | Japan | 73/40.5 R |
| 9000698 | 1/1990 | PCT Int'l Appl. | |
| 2245977 | 1/1992 | United Kingdom | |

Primary Examiner—Hezron E. Williams
Assistant Examiner—Joseph W. Roskos
Attorney, Agent, or Firm—Price, Heneveld, Cooper, DeWitt & Litton

[57] ABSTRACT

A system for detecting leaks in a pipeline includes an outer containment pipe or jacket surrounding a pipe and defining an interstitial space therewith. A plurality of zone fittings are disposed within the containment pipe or jacket to divide the interstitial space into a plurality of zones. Individual external sensors are attached to the containment jacket at each of the zones for detecting the presence of fluid leakage into the interstitial space. The sensors generate an output signal which is operatively connected to visual and/or audible alarms.

24 Claims, 4 Drawing Sheets

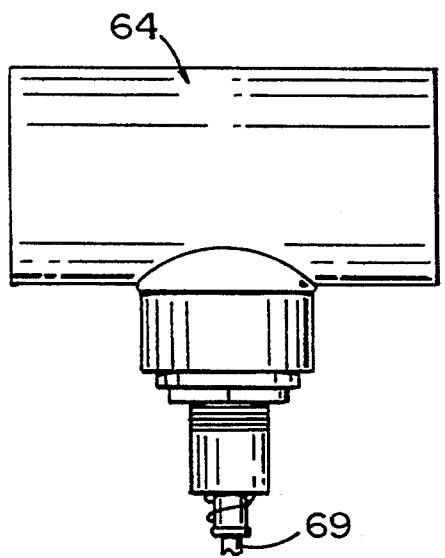
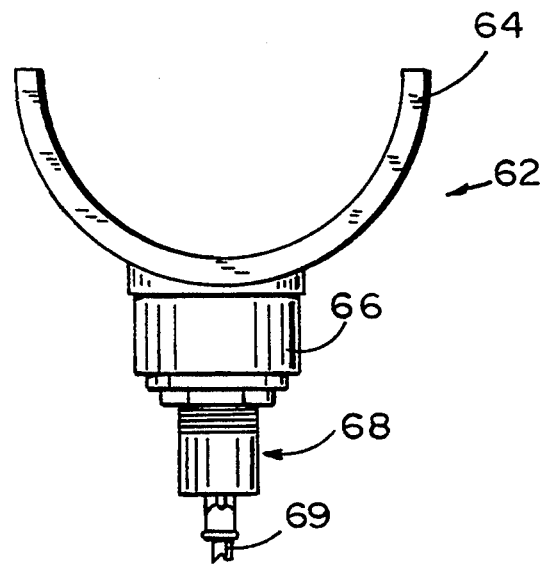
FIG. 4          FIG. 5
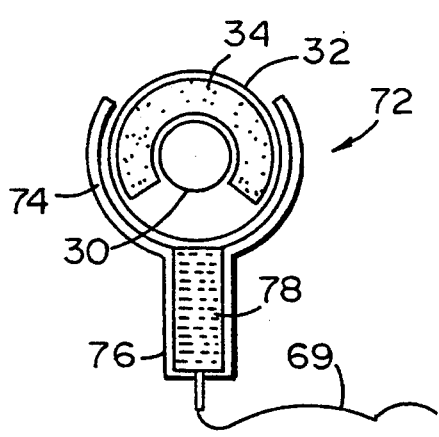
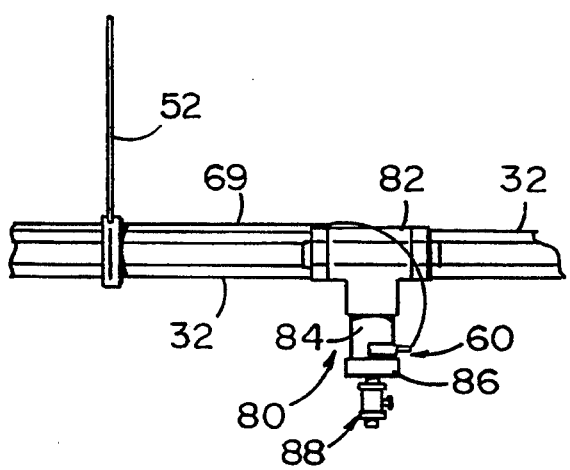
FIG. 6          FIG. 7

PIPELINE LEAK DETECTION SYSTEM

BACKGROUND OF THE INVENTION

The present invention relates to fluid storage and transfer facilities and, more particularly, to systems for detecting pipeline leakage.

A typical storage facility may include a filling station, one or more storage tanks, a pump and a pipeline for conveying fluid from the tank, to a discharge or outlet point in a plant or the like. In many applications, the pipeline may include under ground and above ground portions. For safety and environmental reasons, it may be important to control leakage from a pipeline system and to prevent ground water contamination into the system.

Leakage detection systems have heretofore been proposed. These systems may rely upon visual inspection, the measurement of flow rates and the like to determine if leakage from the pipeline is occurring. In one method, as disclosed in U.S. Pat. No.4,206,402 entitled SYSTEM AND METHOD FOR DETECTING LEAKAGE IN A PIPELINE OR TANK, which issued on Jun. 3, 1980 to Ishido, a sensing coaxial cable is buried adjacent the pipeline or tank. The cable includes an outer conductor divided into a plurality of sections and a continuous inner conductor. The cable is fabricated from a material which prevents water from penetrating therethrough but which permits the penetration of a petroleum product. Leakage is detected by sensing the change in the dielectric constant of the coaxial cable when the cable is penetrated with a petroleum product. A system of this type will not detect ground water penetration into the pipeline.

In order to contain the fluid being stored and conveyed, many facilities employ containment jackets or outer containment pipes which surround the main pipeline. Available leakage detection systems require penetration of the containment jacket. This, of course, may have an adverse effect on the integrity of the containment system.

A need exists for a leak detection system which provides for fluid containment, which detects leakage from a main pipeline into a containment system, which does not require penetration of the containment system and which will also detect ground water contamination of the system.

SUMMARY OF THE INVENTION

In accordance with the present invention, the aforementioned needs are substantially fulfilled. Essentially, a leak detection system is provided which includes an outer containment pipe or jacket surrounding a pipeline and defining therewith an interstitial space. A plurality of zone fittings or dividers are disposed within the containment pipe for dividing the interstitial space into a plurality of separately identifiable zones. Provision is made for detecting leakage into the interstitial zones from the pipeline or from outside of the containment pipe and for generating an output signal which activates a visual and/or audible alarm.

In narrower aspects of the invention, a plurality of external sensors are attached to the containment pipe with at least one sensor at each of the defined zones. The external sensors generate an output signal in response to the presence of a fluid which is to be detected within the interstitial zone. The output signal activates a visual alarm and an audible alarm. In one form, the external sensor is an adjustable capacitive proximity switch. Adjustment is provided for detection of different fluids. The system in accordance with the present invention is readily adapted to use with containment systems. Penetration of the containment system is not necessary. The system is adapted to above ground and under ground installations.

BRIEF DESCRIPTION OF THE DRAWINGS

FIG. 4 is a side, elevational view of a sensor assembly incorporated in the present invention;

Fig. 5 is an end, elevational view of the assembly of FIG. 4;

FIG. 6 is an end, elevational view of an alternative detection subassembly;

FIG. 7 is a side, elevational view of a portion of a pipeline system incorporating a well in accordance with the present invention;

DETAILED DESCRIPTION OF THE PREFERRED EMBODIMENT

Figure 1:
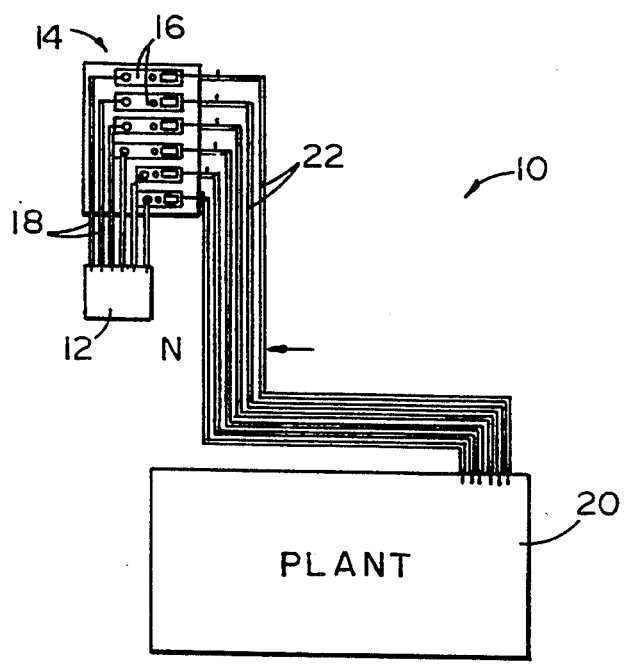
FIG. 1 is a schematic view of a liquid storage facility incorporating the detection system in accordance with the present invention.
Figure 2:
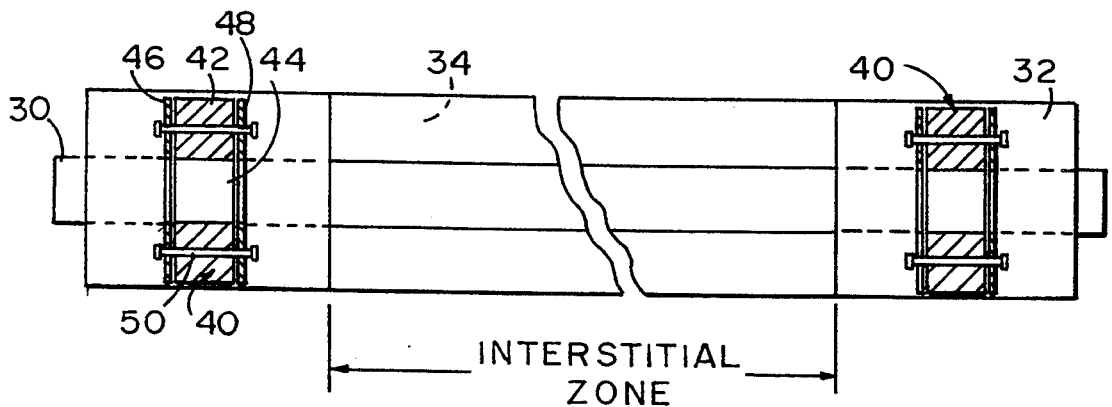
FIG. 2 is an elevational view of a portion of a containment system in accordance with the present invention.

A fluid storage facility system is illustrated in FIG. 1 and generally designated by the numeral 10. System 10 includes a filling station 12 and a tank farm 14 including a plurality of individual storage tanks 16. The fluid stored in tanks 16 is delivered thereto by individual pipelines 18. Fluid is conveyed from tanks 16 to a plant or other use facility 20 by a plurality of individual delivery pipelines 22.

In the preferred form, each individual pipeline 18, 22 is a double wall system including a main pipe 30 and an outer containment jacket or pipe 32. Pipe 32 surrounds pipe 30 and defines an interstitial space 34 therewith. Any leakage from main pipeline 30 is contained within the interstitial space 34 defined by the outer containment pipe or jacket 32. Similarly, ground water penetration into the pipeline 30 is prevented by the containment jacket. The containment system prevents ground water contamination caused by pipeline leakage.

The interstitial space 34 is divided into a plurality of separately identifiable zones by zone fittings or dividers 40. Each zone fitting 40 includes an annular ring or spacer 42. The ring has an outer diameter which conforms generally to the inner diameter of the containment pipe 32. Each spacer 42 further defines a central bore or opening 44 having a diameter corresponding generally to the outer diameter of the inner pipe 30. Resilient gaskets or seals 46, 48 are positioned on the outer faces of rings 42 by suitable fasteners 50. As shown, inner pipe 30 is supported by spacers 42. When the zone fittings 40 are positioned, the fasteners are used to deform the seals 46, 48 into sealing engagement with the inner surface of outer containment pipe 32 and the outer surface of inner pipe 30. The outer containment pipe 32 is also divided into a plurality of separate sections for assembly purposes. In one form, outer pipe 32 is fabricated from a plastic material, such as a polyvinyl chloride (PVC). These sections are joined together by suitable solvents or adhesives in a known manner. Fittings 40 divide the pipeline into a plurality of defined and identifiable zones or sections. The zones permit the source or the location of leakage to be identified more easily.

Figure 3:
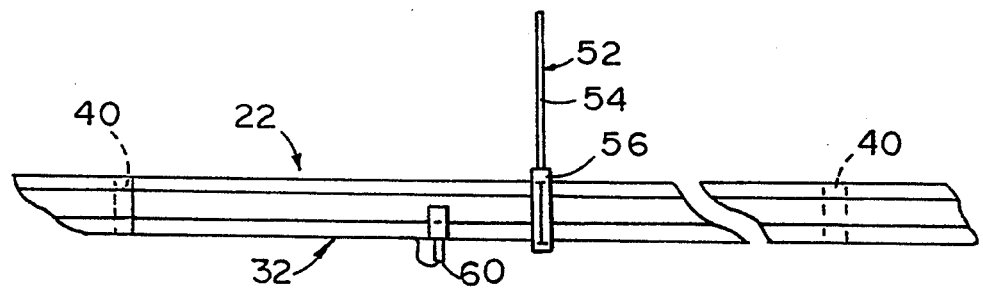
FIG. 3 is an elevational view of an above ground detection system in accordance with the present invention.

FIG. 3 illustrates a section of pipeline 22 which is above grade and suspended from a suitable structure by a pipe hanger 52. Hanger 52 includes a rod 54 and a pipe saddle or clamp 56. Zone fittings 40 divide the section or length of pipeline 22 into a single zone. In accordance with the present invention, an external sensor subassembly 60 is attached to the horizontal run of pipeline 22 between zone fittings 40.

Sensor 60, as shown on FIGS. 4 and 5, includes an attachment bracket 62 having a saddle-shaped portion 64 and a boss 66. A sensor 68 is threadably or otherwise suitably attached to a through bore defined by boss 66. Sensor 68 includes a power supply and output wire bundle 69. Bracket 62 may be fabricated from a suitable plastic material such as PVC. As shown in FIG. 3, saddle 64 is positioned on and, hence, partially surrounds the outer containment pipe 32. The saddle may be attached to the pipe by suitable solvents, adhesives or by clamps. Should leakage occur within the zone defined by fittings 40, as shown in FIG. 3, sensor 68 of subassembly 60 will detect the presence of the fluid and generate an output signal.

One form of sensor 68 in accordance with the present invention is a capacitive proximity switch. Capacitive proximity switches or sensors are commercially available which will sense most materials including nonmetallics. Fluid detection or sensing is performed by a circuit containing an oscillator, a detector stage and an output stage. It is preferred that the capacitive sensor be adjustable to adapt the proximity sensor to sense fluids of different dielectric constants. Although low levels of condensation generally will not have an effect on sensor operation, it is recommended that the interstitial space be purged with clean, dry nitrogen. This will eliminate false alarms caused by condensate and also prevent oxidation of surfaces of the interstitial space. A commercially available capacitive sensor or proximity switch useable in the present invention is available from BAUMER and sold under the model designation No. CFRK 30L24.32.

Capacitive sensors detect the presence of unwanted fluids within the interstitial space by measuring the change in capacitance. The amount of change in capacitance depends upon the dielectric constant of the liquid being sensed. The larger the dielectric constant, the easier it is to detect the liquid. Liquids with high dielectric constants can be easily detected through the walls of containers made of a material with a lower constant. For example, water having a dielectric constant of 80 is readily detected through the wall of a PVC containment pipe which has a dielectric constant of 2.8. A petroleum product such as gasoline has a dielectric constant of 2.2, which is less than that of a PVC containment pipe. Larger quantities of such petroleum products need to be present before an output signal is generated than with aqueous solutions. The particular type of sensor selected, therefore, depends upon the sensitivity desired and the nature of the fluid to be detected.

An alternative form of the sensor subassembly 60 is illustrated in FIG. 6 and generally designated by the numeral 72. Subassembly 72 includes a resilient, saddle-shaped portion 74 and a boss 76 for receiving a sensor element 78. Saddle-shaped portion 74 extends beyond 180 degrees in circumference. The saddle-shaped portion may snap-fit or clip on to the outer containment pipe 32. Alternative subassembly 72 is, therefore, readily attachable to the pipeline system.

Figure 8:
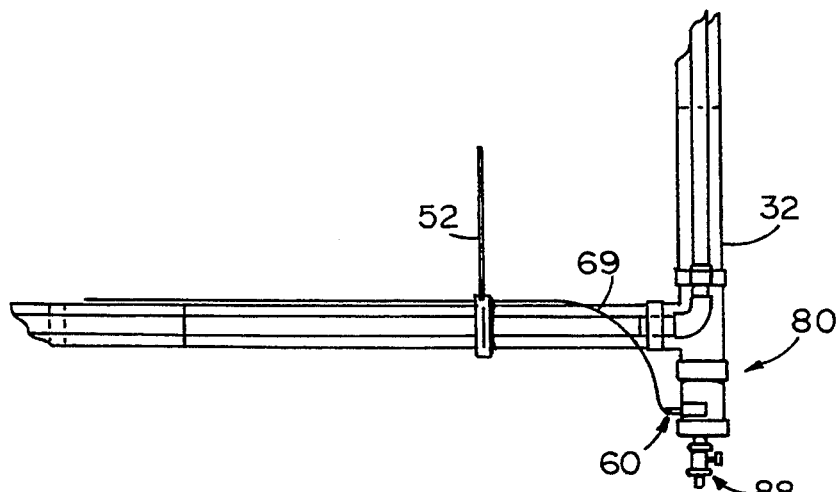
Fig. 8 is an elevational view of another portion of a pipeline system also incorporating a well in accordance with the present invention.

FIGS. 7 and 8 illustrate above ground portions of a pipeline system in accordance with the present invention which incorporate detection wells 80 wherein fluid entering the interstitial space may collect. FIG. 7 shows a horizontal run, and FIG. 8 shows a run with a vertical riser section. As shown, a T-fitting 82 is joined to the individual section of containment pipe 32. A clear pipe section or segment 84 is joined to the T-fitting 82. A cap 86 is joined to the clear section 84. A drain valve 88 is attached to the cap. Well 80 will collect liquid from the interstitial zone. The presence of the liquid may be determined by visual inspection through the clear section 84. In addition, a sensor subassembly 60 is attached to well 80 at cap 86.

Figure 9:
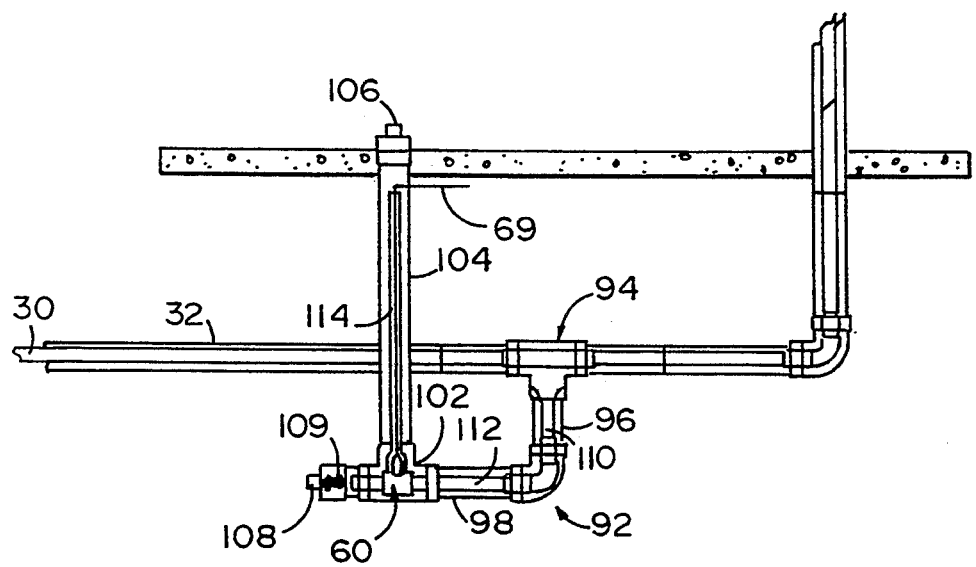
Fig. 9 is an elevational view of an under ground portion of the detection system in accordance with the present invention.

FIG. 9 illustrates an under ground or below grade portion of a pipeline system. The system includes an outer containment pipe 32 surrounding the main pipe 30. A drip leg subassembly 92 is joined to the containment pipe 32 at a T-fitting 94. Drip leg 92 is generally L-shaped including a vertical leg 96 and a horizontal leg or run 98. Another T-fitting 102 is joined to horizontal portion 98. A riser pipe 104 extends from T-fitting 102 to a point above ground. The upper open end of riser 104 is closed by a clean-out plug 106. A clean-out 108 and a drain valve 109 are connected to T-fitting 102. An inner pipe having sections 110, 112 is positioned within the drip leg sections 96, 98. As a result, fluid entering the interstitial space between outer containment pipe 32 and inner pipe 30 will drain into the inner pipe sections 110, 112. A sensor subassembly 60 is attached to a lower end of an elongated sensor extractor 114. Extractor 114 permits placement and removal of sensor subassembly 60 upon removal of the clean-out plug 106 from riser 104. The drip leg 92 is also double contained as is the main pipeline. Fluid draining into the inner pipe sections 110, 112 will intersect the path of sensor 60 which, in turn, will generate an output signal.

Figure 10:
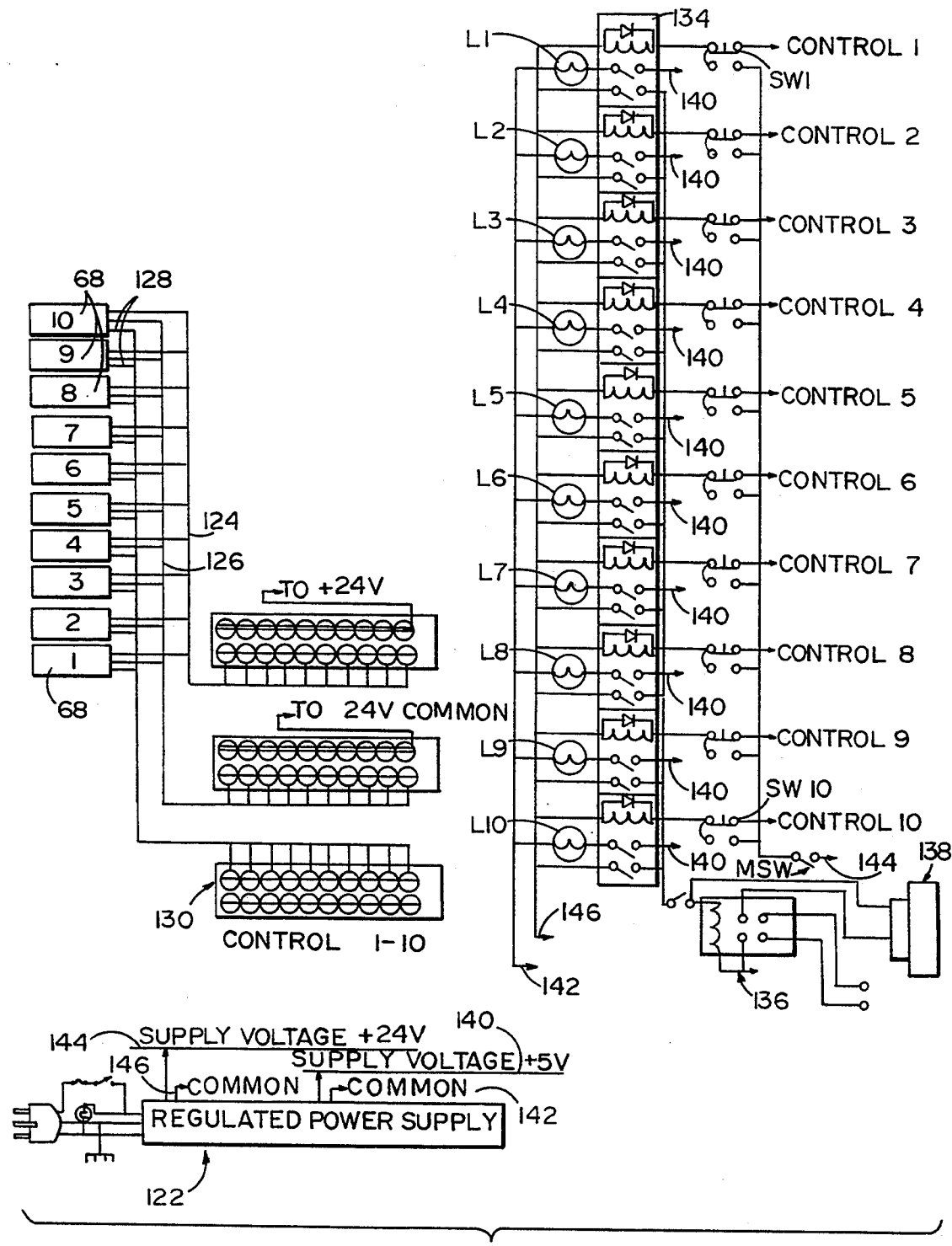
FIG. 10 is an electrical schematic of the sensor and alarm system in accordance with the present invention.

FIG. 10 illustrates an indicator, alarm or output system which is electrically connected to each of the sensors 68. In the system illustrated in FIG. 10, the pipeline is divided into ten separate interstitial zones, and ten sensors are provided. A regulated power supply 122 provides DC output. Power supply 122 is connected to each of the sensors by hot and common wires 124, 126. Output wires 128 from each sensor 68 are connected to a panel input 130. Each of the output wires 128 is connected to an output or a detection indicator panel of an enclosure 132. Enclosure 132 mounts visual indicators or lights designated L1–L10, which correspond to each of the zones 1–10. The electrical system further includes electrical relays 134, test switches SW1–SW10, a main switch MSW, an alarm relay 136 and an audible indicator, such as a horn, 138. Power is supplied to the lights and relays through wires 140, 142, 144, 146.

Figure 11:
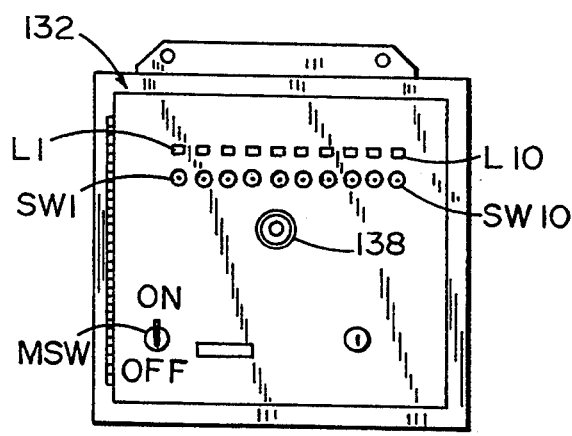
Fig. 11 is an elevational view of an alarm panel.

As should be apparent from FIGS. 10 and 11, when a zone sensor 68 senses the presence of a fluid in its interstitial zone, the output signal will actuate its respective relay 132 causing power to be supplied to the respective light indicator L1–L10. In addition, the audible alarm relay 136 will activate the alarm or horn 138.

Since the system is divided into a plurality of zones, the location of the leak will be readily detected. The proximity switch or sensor will detect leakage from pipe 30 into the interstitial zone defined by containment pipe 32. In addition, ground water contamination or leakage into the containment system from the exterior thereof will also be detected. Visual detection is provided by the wells. The drip legs, which permit fluid to collect for sensing purposes, are also double contained to prevent or limit environmental harm.

In accordance with the present invention, leakage detection is provided without penetration of containment pipes or jackets. Leakage location is easily determined. The system is readily adapted to under ground and above ground installations.

In view of the foregoing description, those of ordinary skill in the art may envision various modifications which would not depart from the inventive concepts disclosed herein. Sensors other than capacitive proximity switches could be used depending upon the type of fluid or other material which is to be sensed and desired sensitivity. For example, inductive sensors which employ a coil and ferrite core assembly, an oscillator, a converter/trigger circuit and an output device may be used. It is expressly intended, therefore, that the above description should be considered as only that of the preferred embodiment. The true spirit and scope of the present invention may be determined by reference to the appended claims.

The embodiments of the invention in which an exclusive property or privilege is claimed are defined as follows:

1. A system for detecting leaks in a pipeline, said system comprising:
   an outer containment pipe surrounding said pipeline and defining an interstitial space therewith;
   a plurality of dividers disposed within said containment pipe for dividing said interstitial space into a plurality of zones;
   a plurality of external sensors attached to said containment pipe at each of said zones for detecting the presence of a fluid contained within said pipeline which has leaked into the interstitial space of one of said zones;
   a well joined to said containment pipe within one of said zones, one of said sensors being attached to said well; and
   output means operably connected to said sensors for providing an indication of the detection of a leak by any one of said sensors.

2. A system as defined by claim 1 wherein each of said sensors comprises:
   a saddle-shaped attachment bracket configured to partially surround said containment pipe.

3. A system as defined by claim 2 wherein each of said sensors further comprises:
   an adjustable capacitive proximity switch mounted on said attachment bracket, said switch generating an output signal when the fluid to be detected leaks into said interstitial space.

4. A system as defined by claim 1 wherein said output means comprises:
   a logic circuit operatively connected to said sensors
   visual indicators operatively connected to said logic circuit; and
   an audible indicator operatively connected to said logic circuit, each of said visual indicators being associated with one of said zones.

5. A system as defined by claim 1 wherein said containment pipe is fabricated from a nonmetallic material.

6. A system as defined by claim 5 wherein said well is fabricated from a clear section of pipe permitting a visual inspection.

7. A system as defined by claim 6 further comprising:
   a drip leg joined to said containment pipe;
   an inner pipe disposed within said drip leg and connecting with said interstitial space so that fluid within said space will drain into said inner pipe;
   a riser joined to said drip leg at a lower end thereof; and
   a sensor extraction member disposed within said riser, one of said sensors being connected to said extraction member, said one of said sensors being positioned on said inner pipe for detecting the presence of fluid in said inner pipe.

8. A system as defined by claim 1 wherein each of said sensors comprises a saddle-shaped attachment bracket configured to partially surround said containment pipe.

9. A system as defined by claim 8 wherein each of said sensors further comprises an adjustable capacitive proximity switch mounted on said attachment bracket, said switch generating an output signal when the fluid to be detected leaks into said interstitial space.

10. A system for detecting leaks in a pipeline, said system comprising:
    an outer containment pipe surrounding said pipeline and defining an interstitial space therewith;
    a plurality of dividers disposed within said containment pipe for dividing said interstitial space into a plurality of zones;
    a plurality of external sensors attached to said containment pipe at each of said zones for detecting the presence of a fluid contained within said pipeline which has leaked into the interstitial space of one of said zones;
    each of said sensors including a saddle-shaped attachment bracket configured to partially surround said containment pipe and an adjustable capacitive proximity switch mounted on said attachment bracket, said switch generating an output signal when the fluid to be detected leaks into said interstitial space;
    output means operably connected to said sensors for providing an indication of the detection of a leak by any one of said sensors; and
    a well joined to said containment pipe within one of said zones, one of said sensors being attached to said well.

11. A system as defined by claim 10 further comprising:
    a drip leg joined to said containment pipe;
    an inner pipe disposed within said drip leg and connecting with said interstitial space so that fluid within said space will drain into said inner pipe;
    a riser joined to said drip leg at a lower end thereof; and a sensor extraction member disposed within said riser, one of said sensors being connected to said extraction member, said one of said sensors being positioned on said inner pipe for detecting the presence of fluid in said inner pipe.

12. A system for detecting leaks in a pipeline, said system comprising:
   an outer containment pipe surrounding said pipeline and defining an interstitial space therewith;
   a plurality of dividers disposed within said containment pipe for dividing said interstitial space into a plurality of zones;
   a plurality of external sensors attached to said containment pipe at each of said zones for detecting the presence of a fluid contained within said pipeline which has leaked into the interstitial space of one of said zones;
   a drip leg joined to said containment pipe;
   an inner pipe disposed within said drip leg and connecting with said interstitial space so that fluid within said space will drain into said inner pipe;
   a riser joined to said drip leg at a lower end thereof;
   a sensor extraction member disposed within said riser, one of said sensors being connected to said extraction member, said one of said sensors being positioned on said inner pipe for detecting the presence of fluid in said inner pipe; and
   output means operably connected to said sensors for providing an indication of the detection of a leak by any one of said sensors.

13. A system for detecting leaks in a pipeline, said system comprising:
   an outer containment pipe surrounding said pipeline and defining an interstitial space therewith;
   a plurality of dividers disposed within said containment pipe for dividing said interstitial space into a plurality of zones;
   a plurality of external sensors attached to said containment pipe at each of said zones for detecting the presence of a fluid contained within said pipeline which has leaked into the interstitial space of one of said zones;
   a well joined to said containment pipe within one of said zones, one of said sensors being attached to said well; and
   output means operably connected to said sensors for providing an indication of the detection of a leak by any one of said sensors, said output means including a logic circuit operatively connected to said sensors, visual indicators operatively connected to said logic circuit, each of said visual indicators being associated with one of said zones; and an audible indicator operatively connected to said logic circuit.

14. A nonintrusive external leak detection system for a double containment pipeline having an inner pipe and an outer containment pipe, said system comprising:
   a plurality of dividers configured to be positioned within the pipeline to divide the containment pipe into a plurality of zones;
   a nonpenetrating density sensor assembly attachable to the pipeline at one of said zones, said sensor assembly being responsive to a change in density of material aligned therewith in said containment pipe in order to generate an output signal when a fluid to be detected enters said one of the zones; and
   alarm means operatively connected to said sensor assembly for generating an alarm in response to said output signal.

15. A leak detection system as defined by claim 14 wherein said dividers each include an annular ring having an outer diameter substantially corresponding to the inner diameter of said outer containment pipe and a center aperture dimensioned to receive said inner pipe.

16. A leak detection system as defined by claim 15 further comprising a well adapted to be connected to and depend from the outer containment pipe, said well including a pipe segment, a cap joined to said segment and a drain valve joined to said cap.

17. A leak detection system as defined by claim 16 further comprising another external sensor operably connected to said alarm means and adapted to be mounted on said pipe segment of said well.

18. A leak detection system as defined by claim 15 further comprising:
   a drip leg including a vertical pipe section and a generally horizontal pipe section;
   a collection pipe within said drip leg adapted to be connected to one of said zones;
   a riser connected to the horizontal pipe section;
   an extractor within said riser; and
   a further sensor assembly on said extractor and engaging said collection pipe.

19. A leak detection system as defined by claim 18 further comprising a well adapted to be connected to and depend from the outer containment pipe, said well including a pipe segment, a cap joined to said segment and a drain valve joined to said cap.

20. A leak detection system as defined by claim 19 further comprising another external sensor operably connected to said alarm means and adapted to be mounted on said pipe segment of said well.

21. A nonintrusive external system for detecting leaks in a liquid pipeline comprising:
   an outer containment pipe surrounding a liquid pipeline and defining an interstitial space therewith;
   a nonpenetrating sensor applied externally to said containment pipe and responsive to a change in density of material within said containment pipe adjacent said sensor in order to produce an output; and
   a control responsive to a change in said output in order to produce an indication of the presence of a liquid in said containment pipe.

22. The system as defined in claim 21 wherein said outer containment pipe includes a low portion lower than other portions of said interstitial space and wherein said sensor is applied to said containment pipe at said low portion.

23. The system as defined in claim 21 wherein said containment pipe is fabricated from a nonmetallic material.

24. The system in claim 21 including a drip leg joined to said containment pipe, an inner pipe disposed within said drip leg and connecting with said interstitial space so that fluid within said space will drain into said inner pipe, and a riser pipe joined to said drip leg at a lower end thereof, wherein said sensor is applied within said riser on said inner pipe for detecting liquid in said inner pipe.

* * * * *